June 25, 1946.  R. A. W. SPOONER  2,402,925
COUPLING OR CONNECTING DEVICE
Filed June 30, 1942  2 Sheets-Sheet 1
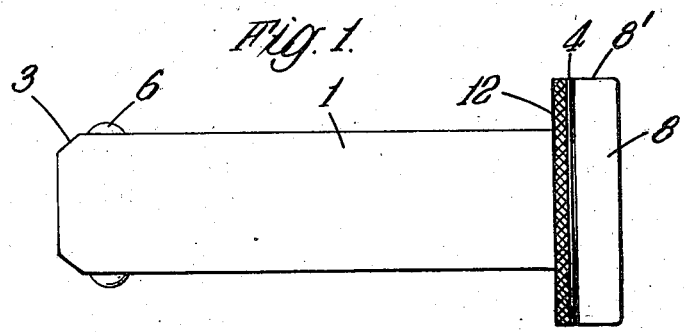
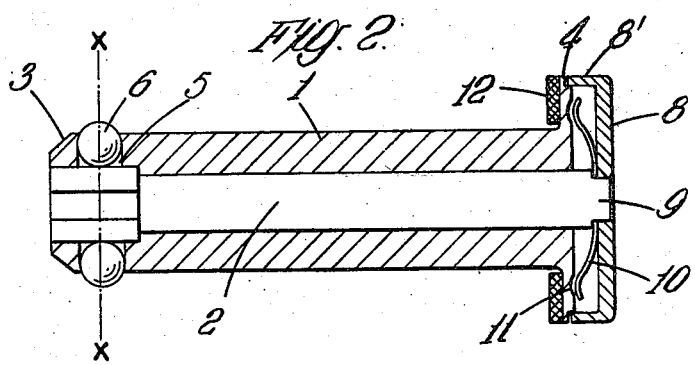
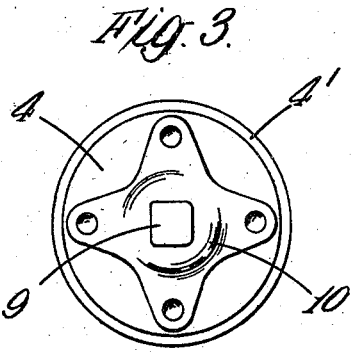
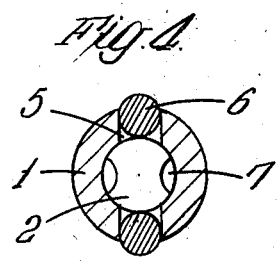
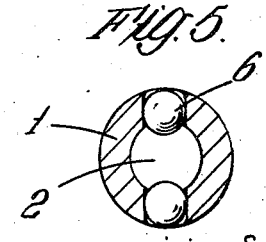
Reginald Arthur William Spooner
INVENTOR
By Otto Munk
his ATTY.

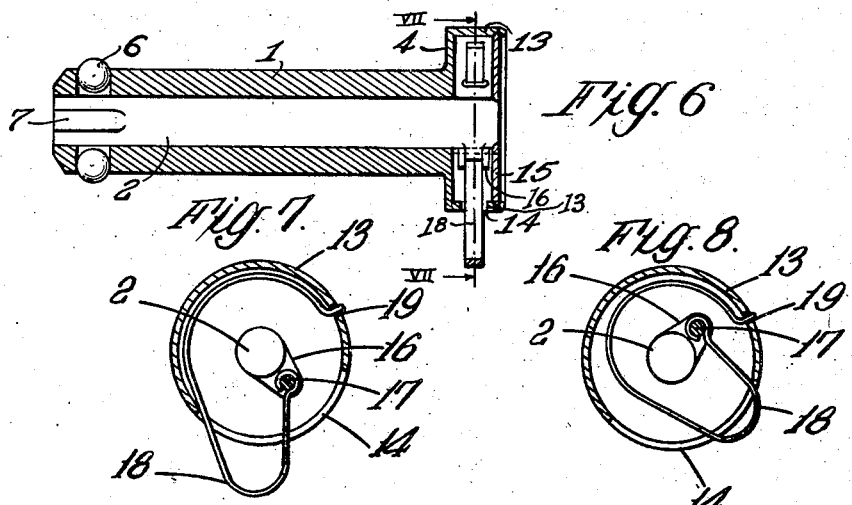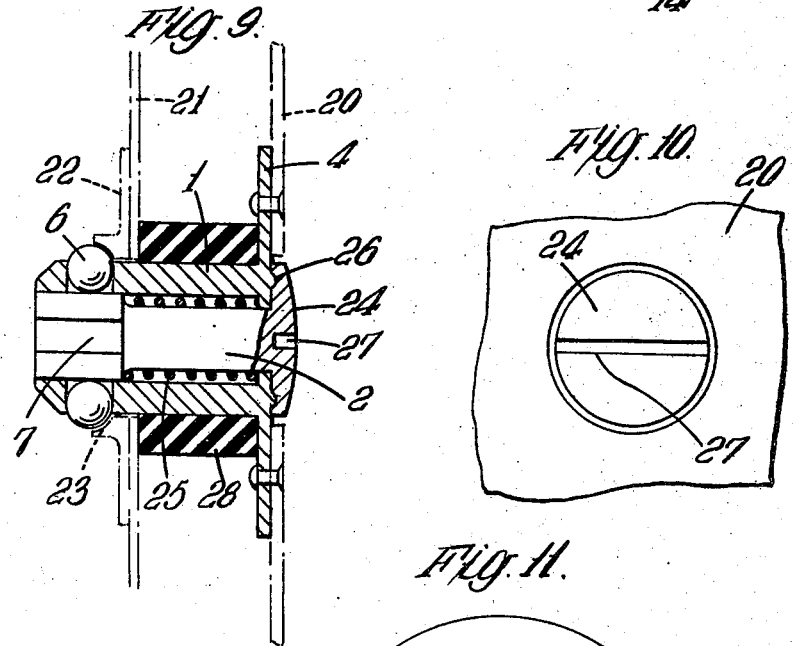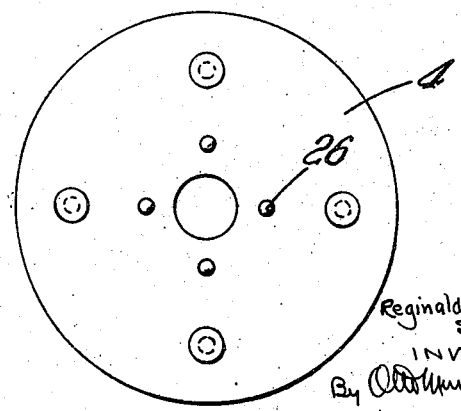

Patented June 25, 1946

2,402,925

UNITED STATES PATENT OFFICE 2,402,925

COUPLING OR CONNECTING DEVICE

Reginald Arthur William Spooner, Walton-on-Thames, England, assignor to Woodfield Engineering Limited, London, England Application June 30, 1942, Serial No. 449,098
In Great Britain July 10, 1941

12 Claims. (Cl. 85—5)

This invention relates to improvements in devices for connecting together a variety of articles by being positioned in registering apertures in the articles or by engaging in an aperture in the one article to lock thereto the other article to which it is secured.

An object of the invention is to provide such a device for simply and rapidly joining the articles together temporarily which is such that whilst when desired the articles may as easily and quickly be separated, the device will not release the articles as the result of blows or vibration.

The device according to the present invention, comprises a tubular body, one or more radially movable elements, each located in a radial passage in the wall of the body, and a rotatable member within the body which in one position allows the element or elements to move inwardly and when rotated into another position, causes said element or elements to move outwardly and holds it or them projecting above the surface of the body. When the radially movable elements are retracted the tubular body may be introduced into registering apertures in the articles to be joined or if fast with the one article, into an aperture in the other article and then by rotating the rotatable member the radially movable elements are caused to project beyond the surface of the body and so prevent it being withdrawn from the aperture or apertures. To disconnect the articles it is only necessary again to rotate the rotatable member so that the elements are free to move inwardly and sink below the surface of the body when the body may be freely withdrawn from the aperture or apertures.

The device as a separate unit has a head or an enlargement at its one end so that when engaged in registering apertures that portion limits movement in the one direction whilst the projecting radially movable elements limit movement in the opposite direction thereby preventing separation of the articles thus joined together.

Means accessible from the outside of the device are provided to enable the rotatable member to be turned, such means comprising, for example, a head adapted for manual operation or to be engaged by a tool and made fast to or formed integral with the rotatable member; the rotatable member, an extension thereof or a part fast therewith, may be adapted to be engaged by a tool such as a screw-driver or like tool effective in a recess; or the rotatable member may be rotated by means of a torsion spring.

The rotatable member has dwells or recess portions and when the radially movable elements enter therein they fall below the surface of the body. As the member is turned, the balls or other elements are displaced and caused to move radially outwards in the bores in which they are located until they project beyond the surface of the body in which position they are held against retraction by the periphery of the rotatable member. Outward movement of elements is limited in any convenient manner, for example, by primming or otherwise constricting the mouths of the bores when the elements are balls. The rotatable member may be rotated in one direction to move the elements to project beyond the surface of the body and in the opposite direction to allow them to move inwardly, or it may be fully rotary when means such as spring detents will be provided to tend to hold the rotatable member in its possible positions relatively to the body to extend and retract the balls. Such means may also, if desired, be provided when the member is rotatable to and fro to tend to hold it in its two possible positions.

The device is especially useful for joining an article which must have a flush outer surface to another article as in this case the body may be attached to the inside of that article with the rotatable member or a part fast therewith extending through and flush with its outer surface, where it is provided with a screw slot or similar recess to enable it to be engaged by a tool. When that article is positioned adjacent the article with the aperture so that the tubular body enters the same, it is only necessary to give the rotatable member a turn to lock the articles together. A plurality of the devices arranged in this way may serve to lock a cover plate or an engine cowling in position, and a resilient member may be disposed around the body to eliminate vibration and clatter.

In order that the invention may be clearly understood and readily carried into effect, examples of carrying the same into effect are hereinafter more fully described with reference to the accompanying drawings which are given for purposes of illustration only and not of limitation.

In these drawings:

Figure 1 is a side elevation of one form of device as a separate unit for use in holding together two or more elements by engaging in registering apertures therein.

Figure 2 is a longitudinal section through the device illustrated in Figure 1.

Figure 3 is a view of the head with the cap removed, as seen from the right hand side of Figure 2.

Figure 4 is a section on the line X—X of Figure 2, and

Figure 5 is a view similar to Figure 4 with the parts in unlocked position.

Figure 6 is a longitudinal section through another form of device as a separate unit.

Figure 7 is a transverse sectional view of the head taken on line VII—VII of Figure 6, and showing the parts in locked position, and Figure 8 is a view similar to Figure 7 showing the position of the parts when operated to unlock.

Figure 9 is a longitudinal section through a modified form of device which is carried by a member for the purpose of locking that member to another.

Figure 10 is a view as seen from the right hand side of Figure 9, and

Figure 11 is a view looking on the body of the device from the right hand side of Figure 9, without the member to which it is attached and the rotatable member.

Referring now to the said drawings, and in particular to Figures 1 to 5, the device comprises a tubular body 1 within which is a freely rotatable member 2. The body 1 is tapered at one end as at 3 and at its other end has a peripheral flange 4. Near the tapered end radial bores 5 extend through the wall of the body 1 and in each of these bores is located a freely movable ball 6. The ball 6 is prevented from escaping outwardly from the bore 5 in which it is located by primming or otherwise constricting the mouth of the radial bore 5 whilst inward movement is limited by contact with the rotatable member 2. Adjacent the radial bore 5 the rotatable member 2 is provided with dwells or recesses 7 such that when the member 2 is rotated to position the recesses 7 in line with the radial bores 5 the balls 6 may move inwardly and sink below the surface of the tubular body 1 as indicated in Figure 5. On the member 2 being rotated through approximately 90° the balls 6 are urged outwardly so that they project above the surface of the tubular body 1 in which position they are locked by the periphery of the member 2 as indicated in Figure 4. Rotation of the member 2 is accomplished manually by means of a flanged cap 8 which is secured on the squared end 9 of the member 2. A star or other conveniently shaped spring 10 is also made fast to the squared end of the member 2 and dwells or recesses 11 are provided in the outer face of the flange 4 with which the points of the spring 10 engage and tend to hold the flanged cap 8 and the rotatable member 2 in position either to lock the balls 6 projecting above the surface of the body 1 or in their retracted positions. On the inner surface of the flange 4 there is provided a fibrous friction washer 12 or the equivalent.

In use the flanged cap 8 is rotated so that the balls 6 sink below the surface of the body 1. The device may now be entered into registering apertures in elements which are to be locked together, and is pushed home until the washer 12 engages one of the elements. The flanged cap 8 may now be rotated relative to the body 1 which is held against rotation by the friction of the washer 12 until the points of the spring 10 engage the alternative dwells 11 after approximately 90° rotation so that the balls 6 are moved outwardly and locked projecting above the surface of the body 1. In this condition, the device cannot be withdrawn as movement in the one direction is limited by the flange 4 and in the other direction by the projecting balls 6. To remove the device it is only necessary to press the washer 12 against the one element and to rotate the flanged cap 8 through a further 90°, or through 90° in the reverse direction, so that the balls 6 may enter the recesses 7.

In order to prevent axial displacement of the member 2 the portion thereof in the region of the bores 5 in the body 1 is conveniently of larger diameter accommodated in a larger bore in the body 1 as shown in Figure 2, whilst displacement in the opposite driection is prevented by the flange $8^1$ bearing against the flange 4 and conveniently in a groove $4^1$ provided for that purpose.

In Figure 6 is illustrated a modified form of device also as a separate unit and similarly comprising a body 1, rotatable member 2, radially movable balls 6 and recesses 7 in the member 2 for controlling the position of the balls 6. In this case, the flange 4 has a peripheral wall 13 in which is a slot 14. The space encompassed by the flange 4 and its wall 13 is closed by a cap 15. The wall 13 is spun over to hold the cap 15 in position. The end of the rotatable member 2 is journalled in the cap 15. A radial arm 16 is made fast to the end of the rotatable member 2 and on this arm 16 is mounted a pin 17 to which is secured one end of a torsion spring 18 which is bent to extend through the slot 14 and then around on the inside of the wall 13 to the point 19 where its end is anchored to the peripheral wall 13. The parts 4, 13, 15 and 18 form an operating head which is gripped by the worker when it is desired to insert the coupling pin into or to withdraw it from the registering apertures in the elements to be locked together. In Figure 7 the parts are shown in the position which they normally occupy when the rotatable member 2 is in the position in which the balls 6 are held projecting above the surface of the body 1. When it is desired to enter the device into registering apertures in parts to be held together, the operating head is gripped by hand so as to displace the spring 18 substantially as indicated in Figure 8 causing it to rotate the arm 16 and member 2 through approximately 90° to bring the recesses 7 into position to allow the balls 6 to sink therein. On releasing the pressure from the spring 18 it will automatically return to normal position so restoring the arm 16 and rotatable member 2 to their original positions so that the latter will lock the balls in their projecting position.

In Figures 9, 10 and 11, there is illustrated a modified form of device for use in locking one part to another. As in the previous examples, the device comprises a body 1 having radial bores therein in each of which is located a freely movable ball 6, the positions of the balls 6 being controlled by the rotation of the member 2 by reason of the recesses 7 provided therein. In this case, the flange 4 on the body 1 is riveted to the one part 20 which is to be locked to the other part 21. The part 21 has secured to it a part 22 which has an aperture sufficiently large to allow the body 1 to enter therein and curved parts 23 against which the balls 6 will rest in operative position. The rotatable member 2 terminates in a flange 24 and between a larger diameter portion of the member 2 and a reduced portion at the end of the body 1 there is arranged a compression spring 25 which urges the flange 24 against the end face of the body 1. Protuberances 26 are provided on the end surface of the body 1 and are adapted to enter registering recesses in the inner face of the flange 24. A slot 27 is provided in the outer surface of the flange 24 in which may engage a screw-driver or similar tool for the purpose of rotating the member 2. As in the previous examples, in one position of the member 2 it holds the balls 6 projecting above the surface of the body 1, whilst when rotated through approximately 90° the balls may enter the recesses 7 and sink below the surface of the body 1. In either of these positions, the protuberances 26 will engage the registering recesses in the flange 24, the necessary axial movement of the member 2 to allow rotation being permitted by the compression spring 25. The appropriate rotation as stated above may be imparted to the member 2 by means of a screw-driver or equivalent tool.

In order that the part 20 may be clamped to the part 21 to make a tight joint which will not vibrate or clatter, a resilient member 28 such as a rubber block may be disposed around the body 1 so that the same must be compressed to permit the body 1 to penetrate sufficiently through the aperture in the parts 21, 22 for the balls 6 to be extended to engage the latter.

In the foregoing examples there are illustrated in the drawings in each case two balls 6 as this number is preferred but equally well there may be only one ball or more than two balls in which case the bores in which they are located are equidistantly spaced around the wall of the body. A recess for each ball will be provided in the rotatable member and the angular rotation thereof is equal to twice the number of balls divided into 360.

I claim:

1. A device for securing at least two parts together by engaging in at least one aperture in one of said parts, said device comprising a hollow body provided with at least one radial bore near its one end and having an enlargement at its other end, a freely movable member in said radial bore from which it cannot escape outwardly, a rotatable member in said hollow body which normally holds said freely movable member projecting above the surface of the hollow body, said rotatable member being provided with a recess permitting said freely movable member to sink below the surface of the hollow body on rotation of the rotatable member into another angular position, means for rotating said rotatable member, and spring means tending to hold said rotatable member in at least one of its angular positions.

2. A device for securing at least two parts together by engaging in at least one aperture in one of said parts, said device comprising a hollow body provided with at least one radial bore extending through its wall near one end and having a head at its other end, a freely movable ball in said radial bore from which it cannot escape outwardly, a rotatable member in said hollow body which in one angular position holds said ball projecting above the surface of the hollow body, said rotatable member being provided with a recess permitting said ball to sink below the surface of the hollow body on rotation of the rotatable member into another angular position, means including a spring operative to hold said rotatable member in each of its angular positions, and means for rotating said rotatable member.

3. A quick-release coupling pin comprising a tubular body provided with at least one radial bore near its one end and having an enlargement at its other end, a freely movable ball in said radial bore from which it cannot escape outwardly, a rotatable member in said tubular body which normally holds said ball projecting above the surface of the hollow body, said rotatable member being provided with a recess permitting said ball to sink below the surface of the hollow body on rotation of the rotatable member into another angular position, and a cap secured to said rotatable member for the purpose of rotating it.

4. A device for securing at least two parts together by engaging in at least one aperture in one of said parts, said device comprising a hollow body provided with a pair of opposed radial bores through its wall near one end and having a head at its other end, a freely movable ball in each of said radial bores from which they cannot escape outwardly, a rotatable member in said hollow body which in one angular position holds said balls projecting above the surface of the hollow body, said rotatable member being provided with opposed recesses permitting said balls to sink below the surface of the hollow body on rotation of the rotatable member through 90° into another angular position, means including a spring operative to hold said rotatable member in each of its angular positions, and means for rotating said rotatable member.

5. A device for securing at least two parts together by engaging in at least one aperture in one of said parts, said device comprising a hollow body provided with at least one radial bore near one end and having a head at its other end, a freely movable ball in said radial bore from which it cannot escape outwardly, a rotatable member in said hollow body which in one angular position holds said ball projecting above the surface of the hollow body, said rotatable member being provided with a recess permitting said ball to sink below the surface of the hollow body on rotation of the rotatable member into another angular position, and means including a spring operative to hold said rotatable member in the first of its angular positions to hold said ball projecting above the surface of the hollow body.

6. A device for securing at least two parts together in which the one part carries a hollow body provided with at least one radial bore near its end and which enters an aperture in the other part, a freely movable member in said radial bore from which it cannot escape outwardly, a rotatable member in said hollow body which normally holds said freely movable member projecting above the surface of the hollow body, said rotatable member being provided with a recess permitting said freely movable member to sink below the surface of the hollow body on rotation of the rotatable member into another angular position, means for rotating said rotatable member, and means tending to hold said rotatable member in each of its angular positions.

7. A device for securing at least two parts together comprising a tubular body provided with at least one radial bore near its one end and having a flange at its other end, by which the body is secured to one of the parts, a freely movable ball in said radial bore from which it cannot escape outwardly, a rotatable member in said tubular body which normally holds said ball projecting above the surface of the hollow body, said rotatable member being provided with a recess permitting said ball to sink below the surface of the tubular body to permit the body to enter and leave an aperture in the other part on rotation of the rotatable member into another angular position, means tending to hold said rotatable member against rotation, means in one end of said rotatable member for engagement by a tool to rotate that member.

8. A device for securing at least two parts together comprising a hollow body provided with at least one radial bore near its one end and having a flange at its other end, by which the body is secured to one of the parts, a freely movable ball in said radial bore from which it cannot escape outwardly, a flange ended rotatable member in said tubular body which in one angular position holds said ball projecting above the surface of the hollow body, said rotatable member being provided with a recess permitting said ball to sink below the surface of the hollow body to permit the body to enter and leave an aperture in the other part on rotation of the rotatable member into another angular position, means tending to hold said rotatable member in its different angular positions, means in the flanged end of said rotatable member for engaging by a tool to effect rotation of that member, and a resilient element disposed around the body to be engaged by the parts when held together.

9. A device for securing at least two parts together by engaging in at least one aperture in one of said parts, said device comprising a hollow body provided with at least one radial bore near one end and having a hollow head at its other end, a freely movable ball in said radial bore from which it can not escape outwardly, a rotatable member in said hollow body which in one angular position holds said ball projecting above the surface of the hollow body, said rotatable member being provided with a recess permitting said ball to sink below the surface of the hollow body on rotation of the rotatable member into another angular position, a crank arm on said rotatable member disposed in said hollow head, and a spring disposed at least partially in said hollow head and being secured to the latter and to said crank arm of said rotatable member to urge the same into its angular position in which it holds said ball projecting above the surface of the hollow body.

10. A quick-release coupling pin comprising, in combination, a tubular body formed with at least one radial bore in the wall thereof, a floating member confined within said bore and movable radially of said body between positions in which it respectively projects from said bore to form an abutment on said pin and lies sufficiently within said body to cease to form such abutment, a rod mounted to turn in said tubular body and operative in one angular position to force said movable member to project from said bore and in another angular position to permit it to recede into said bore, means by which said rod may be turned between said angular positions, and means for holding said rod in the first of said angular positions.

11. A quick-release coupling pin comprising, in combination, a tubular body formed with at least one radial bore in the wall thereof, a member confined within said bore and movable between positions in which it respectively projects from said bore to form an abutment on said pin and lies sufficiently within said body to cease to form such abutment, a rod mounted to turn in said tubular body and operative in one angular position to force said movable member to project from said bore and in another angular position to permit it to recede into said bore, an operating head, and rod-turning means carried by said head and actuated upon manual gripping of said head to turn said rod in said body from the first to the second of said angular positions, said rod-turning means including a spring for restoring said rod to said first angular position on release of the manual grip on said head.

12. A quick-release coupling pin comprising, in combination, a tubular body formed with at least one radial bore in the wall thereof, a member confined within said bore and movable between positions in which it respectively projects from said bore to form an abutment on said pin and lies sufficiently within said body to cease to form such abutment, a rod mounted to turn in said tubular body and operative in one angular position to force said movable member to project from said bore and in another angular position to permit it to recede into said bore, an operating head, and rod-turning means in said head for turning said rod in said body from the first to the second of said angular positions, said rod-turning means including a spring interposed between said head and said rod for restoring said rod to said first angular position.

REGINALD ARTHUR WILLIAM SPOONER.